United States Patent [19]

Kawashima et al.

[11] Patent Number: 4,748,204

[45] Date of Patent: May 31, 1988

[54] FLEXIBLE AND MELT PROCESSABLE FLUORORESIN

[75] Inventors: Chikashi Kawashima, Kamifukuoka; Seiiti Minegishi, Saitama; Shinji Ogasawara, Kamifukuoka; Takashi Mukaino, Kawagoe, all of Japan

[73] Assignee: Central Glass Company, Limited, Ube, Japan

[21] Appl. No.: 906,825

[22] Filed: Sep. 12, 1986

[30] Foreign Application Priority Data

Sep. 19, 1985 [JP] Japan .................................. 60-205413

[51] Int. Cl.$^4$ ........................ C08L 27/16; C08L 51/00
[52] U.S. Cl. ......................................... 525/72; 525/64
[58] Field of Search ........................................ 525/72

[56] References Cited

U.S. PATENT DOCUMENTS 4,472,557  9/1984  Kawashima et al. ............... 525/276
4,560,737  12/1985  Yamamoto et al. .................. 525/72

Primary Examiner—Carman J. Seccuro
Attorney, Agent, or Firm—Foley & Lardner, Schwartz, Jeffery, Schwaab, Mack, Blumenthal & Evans

[57] ABSTRACT

A melt-processable fluororesin of wide use is obtained by blending 100 parts by weight of a soft and melt-processable fluorine-containing graft copolymer in which crystalline fluoro-polymer segments are grafted to an elastomeric fluoro-polymer segment and 1–90 parts by weight of a crystalline fluoro-polymer which comprises the structural units of the crystalline fluoro-polymer segments of the graft copolymer. For example, a graft copolymer obtained by graft copolymerization of vinylidene fluoride (VDF) with an elastomeric copolymer of VDF, chlorotrifluoroethylene and an unsaturated peroxy compound is blended with either homopolymer of VDF or a copolymer of VDF and another monomer. By the blending some important characteristics of the graft copolymer such as elastic modulus, hardness and melt flow rate are desirably modified without serious lowering of tensile strength and elongation.

8 Claims, 2 Drawing Sheets

FLEXIBLE AND MELT PROCESSABLE FLUORORESIN

BACKGROUND OF THE INVENTION

This invention realtes to a fluororesin which possesses flexibility and sufficient mechanical strength and is good in melt processability. The fluororesin is a blend of a crystalline fluororesin and a soft fluororesin which is essentially a graft copolymer obtained by graft polymerization of a fluorine-containing monomer, which gives a crystalline polymer, in the presence of an elastomeric fluoro-polymer.

Various fluororesins are known as functional resins excellent in chemical resistance, weather resistance, heat resistance and so on. Nowadays fluororesins are indispensable materials in many fields of high-technology.

Where good flexibility is required for fluororesins as in the cases of using in hoses, gaskets, seals, cable coverings and roll sheathings it is usual to use fluororubbers. However, processing of fluororubbers requires complicated operations because molding of fluororubber needs to be preceded by kneading of a mixture of raw rubber and additives such as stabilizers, fillers and cross-linking agent and needs to be followed by a cross-linking treatment at a controlled temperature. For the same reason there are limitations on the shapes of articles or parts to be formed of fluororubbers. In some cases it offers another problem that cross-linked fluororubbers can hardly be remelted for further processing.

In view of such inconveniences of fluororubbers there is a strong demand for development of fluororesins which possess flexibility and melt-processability including remeltability.

One way of obtaining a flexible and melt-processable fluororesin is copolymerization. However, improvement in flexibility by copolymerization is usually accompanied by lowering in melting temperature of the fluoro-copolymer so that the copolymer becomes inferior in heat resistance to conventional thermoplastic fluororesins, or the copolymer becomes unsatisfactory in mechanical properties. Another way is polymer blending. In practice, however, there are not many kinds of polymers that are well compatible with fluoropolymers and serve the plasticizing purpose. Even though a polymer reported to be good in compatibility is used for blending it is often that the important properties of the fluororesin are deteriorated by the blending.

U.S. Pat. No. 4,472,557 discloses fluorine-containing graft copolymers that possess flexibility and melt-processability. The graft copolymers are comprised of a fluorine-containing elastomeric polymer segment and a fluorine-containing crystalline polymer segment, and either of the two types of polymer segments is grafted to the other. The graft polymerization is accomplished by utilizing thermal decomposition of peroxy bonds contained in the "trunk" polymer segment. From a practical point of view, much interests is shown in the graft copolymers using a fluorine-containing elastomeric polymer as the "trunk" segment. In this type of graft copolymers the inferior melt-processability of the fluoroelastomer is compensated for and is remarkably improved by grafting a fluorine-containing crystalline polymer. Furthermore, at temperatures below the melting point of the grafted crystalline polymer the crystalline polymer segments act as physical cross-linking points so that the graft copolymer exhibits physical properties resembling the properties of a chemically cross-linked fluoro-elastomer.

In a graft copolymer of the aforementioned type using a given combination of an elastomeric fluoro-polymer and a crystalline fluoro-polymer the degree of flexibility of the copolymer depends mainly on the molecular weight of the crystalline fluoro-polymer used as the "branch" segments and the number of the branches. An increase in either the molecular weight of the crystalline fluoro-polymer or the number of the crystalline branches leads to an increase in the aforementioned physical cross-linked points and, therefore, brings about enhancement of the modulus of elasticity and hardness of the graft copolymer. Besides, an increase in the physical cross-linking points brings about lowering of melt viscosity and enhancement of melt flow rate of the graft copolymer. That is, in general an increase in the weight percentage of the crystalline fluoro-polymer in the graft copolymer leads to enhancement of both elastic modulus and melt flow rate of the graft copolymer, whereas a decrease in the same component leads to enhancement of flexibility of the graft copolymer and lowering of melt flow rate of the copolymer.

Thus, the degree of flexibility and melt flow rate of the graft copolymer can freely be adjusted by varying the weight ratio of the grafted crystalline fluoropolymer to the elastomeric fluoro-polymer used as the "trunk" segment. Therefore, for each combination of elastomeric and crystalline fluoro-polymers it is possible to produce graft copolymers of many grades so as to cover a very wide range that extends from a near-fluororubber region to a near-rigid fluororesin region. Accordingly a wide variety of applications are found in the fluorine-containing graft copolymers. However, the need of manufacturing industrial products of so many grades for each type of fluorine-containing graft copolymer offers inconvenience to the manufactures.

The disclosure of U.S. Pat. No. 4,472,557 includes a fluororesin composition obtained by blending 100 parts by weight of polyvinylidene fluoride (PVDF) with 1-100 parts by weight of a soft fluororesin prepared by graft polymerization of vinylidene fluoride (VDF) in the presence of an elastomeric fluoro-polymer having peroxy bonds. The blending has the effect of improving a crystalline PVDF resin particularly in impact resistance and low temperature characteristics.

SUMMARY OF THE INVENTION

It is an object of the present invention to provide a fluororesin which possesses flexibility and melt-processability by blending a relatively small amount of a crystalline fluororesin with a relatively large amount of a fluorine containing graft copolymer of the above described type.

The present invention provides a flexible and melt-processable fluororesin, which is essentially a blend of 100 parts by weight of a first fluororesin, which is obtained by graft copolymerization of at least one fluorine-containing monomer that gives a crystalline polymer with an elastomeric fluoro-copolymer having peroxy bonds, and 1-90 parts by weight of a crystalline second fluororesin which is obtained by polymerization of at least all of said at least one fluorine-containing monomer.

This invention is based on our discovery that very uniform polymer blend can be accomplished when a fluorine-containing graft copolymer of the above desdribed type is blended with a relatively small amount of a fluorine containing crystalline polymer, or copolymer, which comprises structural units similar to the structural units of the crystalline "branch" segments of the graft copolymer, and that by such blending it is practicable to widely modify various properties of the graft copolymer including elastic modulus, hardness and melt flow rate.

According to the specification of U.S. Pat. No. 4,472,557 it is probable that the product of the disclosed graft copolymerization method is not a pure graft copolymer and is a mixture of a graft copolymer and some amounts of unreacted elastomeric and crystalline polymers. However, it is presumed that in such a mixture the existence of the graft copolymer has the effect of very uniforming mixing of the ungrafted polymers with each other and also with the graft copolymer. Furthermore, at temperatures below the melting point of the crystalline fluoro-polymer the aforementioned function of the "branch" segments of the graft copolymer as physical cross-linking points contributes to enhancement of tensile strength and elongation of the mixture compared with a mixture of the elastomeric and crystalline fluoro-polymers only. Also in a fluoro-resin according to the invention it is probable that the "branch" segments of the graft copolymer serve a similar function since the blending according to the invention gives a very uniformly mixed blend without significantly deteriorating the mechanical properties, and particularly tensile strength at break and elongation at break, of the graft copolymer used as the basic material.

When a relatively small amount of a fluorine-containing graft copolymer of the same type is blended with a larger amount of PVDF as disclosed in U.S. Pat. No. 4,472,557, the obtained resin composition will be of a dispersed phase, i.e. dispersion of a relatively small amount of a near-rubber graft copolymer in a near-rigid matrix of PVDF. In contrast, a blended fluororesin according to the invention is of a near-continuous phase produced by uniform dispersion of a relatively small amount of a crystalline fluoro-polymer in a soft matrix of the graft copolymer with good interaction between the two kinds of polymers.

The crystalline fluoro-polymer used in this invention as the blending material is not necessarily identical with the crystalline polymer segment of the graft copolymer. For example, when the crystalline polymer segment of the graft copolymer is a homopolymer the crystalline fluoro-polymer as the blending material may be either a homopolymer of the same monomer or a copolymer of the same monomer and another monomer. When the crystalline polymer segment of the graft copolymer is a binary copolymer the crystalline fluoro-polymer as the blending material may be either a similar binary copolymer or a ternary copolymer of the two monomers for the binary copolymer and another monomer. The crystalline polymer or copolymer as the blending material may be different in molecular weight from the crystalline polymer segment of the graft copolymer. By selecting the chemical structure and/or molecular weight of the crystalline fluoro-polymer as the blending material it is possible to variously modify the mechanical properties and the degree of melt-processability of a given fluorine-containing graft copolymer. Accordingly it becomes unnecessary to produce many kinds of fluorine-containing graft copolymers which are only slightly different from one another. Needless to mention, in general polymer blending is more convenient than graft polymerization.

Also it is an advantage of the present invention that melt-processable fluororesins having adequate and strongly demanded hardness can easily be obtained. Conventional fluororesins of melt-processable type are mostly higher than 65 in Shore D scale hardness. Recently there is an increasing demand for fluororesins whose Shore D hardness ranges from about 45 to about 70. However, on the current market there is no melt-processable fluororesin whose Shore D hardness is below 60. PTFE resins exhibit Shore D hardness of 50-55, but PTFE resins are not melt-processable due to very high melt viscosity. In the fluororesins according to the invention it is easy to control the Shore D hardness to a desired value between about 70 and about 45.

As will be understood from the foregoing description, flexible fluororesins according to the invention have very wide uses. For example, these fluororesins are suitable for use in various tubes, films, sheets, diaphragms, cable coverings, and molded articles such as gaskets, flat packings, O-rings and sealing elements of other types.

DESCRIPTION OF THE PREFERRED EMBODIMENTS

Figure 1:
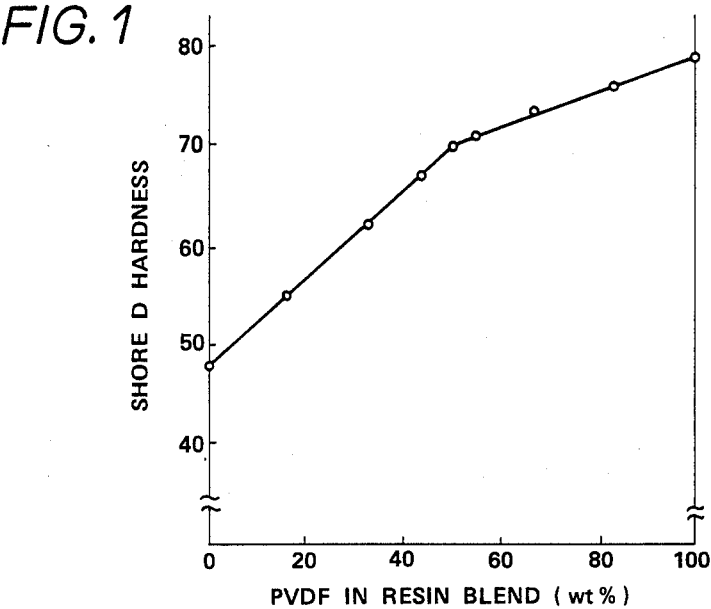
FIG. 1 is a graph showing the dependence of Shore D hardness of a polymer blend of PVDF and a fluorine-containing soft graft copolymer on the amount of PVDF in the blend.

In every fluorine-containing graft copolymer used in this invention the basic or "trunk" segment is an elastomeric copolymer, which is obtained by copolymerizing at least one kind of fluorine-containing monomer and a different kind of monomer that has both double bond and peroxy bond (such a monomer will be called an unsaturated peroxide) at a temperature at which the peroxy bond in the unsaturated peroxide hardly decomposes. Accordingly the elastomeric copolymer has peroxy bonds in side chains. The copolymerization reaction is carried out by using a radical initiator. For example, the elastomeric copolymer is a ternary copolymer of vinylidene fluorice (VDF), hexafluoropropene (HFP) and an unsaturated peroxide, a quaternary copolymer of VDF, HFP, tetrafluoroethylene (TFE) and an unsaturated peroxide, a ternary copolymer of VDF, chlorotrifluoroethylene (CTFE) and an unsaturated peroxide, a ternary copolymer of TFE, propylene and an unsaturated peroxide or a ternary copolymer of TFE, perfluorovinyl ether and an unsaturated peroxide.

Examples of useful unsaturated peroxides are t-butyl peroxymethacrylate, t-butyl peroxyacrylate, t-butyl peroxyallylcarbonate, n-butyl peroxyallylcarbonate, di(t-butylperoxy)fumarate, t-butyl peroxycrotonate and p-menthane peroxyallylcarbonate. It is suitable that the proportion of the unsaturated peroxide to the fluorine-containing monomer(s) is in the range from 0.05:100 to 20:100 by weight. If the amount of the unsaturated peroxide is smaller it is difficult to accomplish efficient grafting of a crystalline polymer to the elastomeric copolymer. When a larger amount of the unsaturated peroxide is used it is likely that the resultant copolymer is unsatisfactory in its properties as a fluoro-elastomer.

A fluorine-containing graft copolymer which serves as a soft fluororesin is obtained by grafting a fluorine-containing crystalline polymer to the above described elastomeric copolymer. The grafting is accomplished by polymerizing a suitable fluorine-containing monomer in the presence of the elastomeric copolymer and a solvent or a liquid medium at a temperature high enough to decompose the peroxy bonds in the elastomeric copolymer. That is, the radicals formed by the decomposition of the peroxy bonds induc polymerization of the fluorine-containing monomer and grafting of the formed crystalline polymer to the elastomeric copolymer used as the "trunk" segment. The fluorine containing monomer subjected to graft copolymerization is selected, for example, from CTFE, mixtures of CTFE and ethylene, TFE, mixtures of TFE and ethylene, mixtures of TFE and HFP, mixtures of TFE and perfluorovinyl ether, VDF or vinyl fluoride. In general the elastomeric copolymer used as the "trunk" segment has a glass transition temperature below room temperature, and the polymer which becomes the "branch" segment of the graft copolymer is a crystalline polymer whose melting point is not lower than 130° C.

The above described graft copolymer is prepared such that the proportion of the elastomeric "trunk" segment to the crsytalline "branch" segments falls in the range from 50:50 to 99:1, and preferably from 50:50 to 90:10, by weight. The modulus of elasticity of the graft copolymer increases as the proportion of the crystalline polymer segment is increased so that the graft copolymer hardly possesses desired softness and flexibility when the crystalline segment amounts to more than 50 wt %. If the amount of the crystalline segment is less than 1 wt % the object of grafting is hardly accomplished, and it is difficult to obtain a uniform polymer blend according to the present invention.

This invention relates to a blend of the above described graft copolymer, which is a soft fluororesin, and a fluorine-containing crystalline polymer or copolymer. This crystalline polymer or copolymer is required to be similar in structural units to the crystalline "branch" segments of the graft copolymer or to be comprised of the structural units of said crystalline "branch" segments and a minor amount of different structural units attributed to at least one additional comonomer. For example, the fluorine-containing crystalline polymer or copolymer for blending is selected in the following manners.

When the crystalline "branch" segment of the graft copolymer is homopolymer of CTFE, the graft copolymer may be blended with homopolymer of CTFE, a copolymer of CTFE and VDF or a copolymer of CTFE and vinyl chloride. When the "branch" segment is a copolymer of CTFE and ethylene, the graft copolymer may be blended with a copolymer of CTFE and ethylene or a ternary copolymer of CTFE, ethylene and vinyl ether.

When the "branch" segment is a copolymer of TFE and ethylene, the graft copolymer may be blended with a copolymer of TFE and ethylene or a ternary copolymer of TFE, ethylene and vinyl ether. When the "branch" segment is a copolymer of TFE and HFP, the graft copolymer may be blended with a copolymer of TFE and HFP or a ternary copolymer of TFE, HFP and perfluorovinyl ether. When the "branch" segment is a copolymer of TFE and perfluorovinyl ether, the graft copolymer may be blended with a copolymer of TFE and perfluorovinyl ether or a ternary copolymer of TFE, HFP and perfluorovinyl ether.

When the "branch" segment is homopolymer of VDF, the graft copolymer may be blended with homopolymer of VDF, a copolymer of VDF and trifluoroethylene, a copolymer of VDF and TFE, a copolymer of VDF and vinyl fluoride or a copolymer of VDF and hexaluoro-acetone.

When the "branch" segment is homopolymer of vinyl fluoride, the graft copolymer may be blended with homopolymer of vinyl fluoride or a copolymer of vinyl fluoride and ethylene.

Blending of the fluorine-containing graft copolymer with a crystalline polymer or copolymer which consists of the same structural units as the "branch" segments of the graft copolymer and differs in molecular weight from the "branch" segments mainly affects the mechanical properties of the blended resin at high temperatures. More particularly, when the crystalline polymer, or a copolymer, used for blending is lower in molecular weight the resin obtained by blending becomes lower in melt viscosity and also in high temperature tensile strength. Therefore, it is possible to prepare several kinds of blended resins different in melt processability and high temperature characteristics merely by variously selecting the molecular weight of a crystalline polymer to be blended with the graft copolymer.

Blending of the graft copolymer with a crystalline polymer or copolymer which is not similar in structural units to the "branch" segments of the graft copolymer is effective for modifying not only the high temperature characteristics of the fluororesin but also some other properties such as, for example, chemical resistance and adhesive property.

In blending a fluorine-containing graft copolymer with a fluorine-containing crystalline polymer, or a copolymer, the proportion of the graft copolymer to the crystalline polymer is limited within the range from 100:1 to 100:90, and preferably from 100:5 to 100:80, by weight. If the amount of the crystalline polymer is less than 1 phr it is impracticable to modify any property of the graft copolymer. The maximum amount of the crystalline polymer is set at 90 phr because the addition of a larger amount of the same is liable to give a resin insufficient in flexibility and relatively high in hardness, and also because there arises a possibility that blending gives a dispersed phase instead of a desired near-continuous phase as the amount of the crystalline polymer nears 100 phr. In view of commercial demands, it is favorable to accomplish blending so as to obtain a fluororesin whose Shore D scale hardness is below 70.

The blending operation for preparing a fluororesin according to the invention can be performed by any method that is applicable to conventional thermoplastic resins. That is, the graft copolymer and the crystalline polymer or copolymer are blended and kneaded under appropriate heating in a suitable mixer such as Henschel mixer, V-shaped blender, ribbon blender or planetary mixer. Blending with hot rolls is also possible. The obtained blend is a thermoplastic and melt-processable material that can easily be formed into desired shapes by extrusion, injection molding, compression molding, calendering or press-shaping. In some cases it is also possible to blend the graft copolymer and the crystalline polymer or copolymer by dissolving the both materials in a solvent and to obtain a film or a thin layer of the desired polymer blend by evaporating the solvent.

The invention is further illustrated by the following nonlimitative examples.

EXAMPLE 1

A fluorine-containing elastomeric copolymer was prepared by the following process.

Initially, 5000 g of purified water, 10 g of potassium persulfate, 2 g of ammonium perfluorooctanoate and 10 g t-butyl peroxyallylcarbonate (abbreviated to BPAC) were put into a 10-liter stainless steel autoclave. After purging the gas atmosphere, 1250 g of VDF monomer and 755 g of CTFE monomer were charged into the autoclave. The resultant mixture was subjected to copolymerization reaction at 50° C. for 20 hr with continuous stirring. The reaction product was a white latex, from which a rubber-like powder was recovered by salting-out treatment. The powder was washed with water, dried in vacuum, then washed with n-hexane to completely remove unreacted residue of BPAC and again dried in vacuum. The dried powder weighed 1700 g. This powder was of an elastomeric copolymer of VDF, CTFE and BPAC. Thermal analysis of the VDF/CTFE/BPAC copolymer with a differential scanning calorimeter (DSC) revealed the existence of an exothermic peak at 160°–180° C., which was attributed to decomosition of peroxy bonds. By DSC analysis at low temperatures the glass transition temperature, $T_g$, of the copolymer was determined to be −21° C. By iodometric titration the content of active oxygen in the copolymer was measured to be 0.042%.

Grafting of PVDF to the elastomeric VDF/CTFE/BPAC copolymer was accomplished in the following manner.

First, 120 g of the VDF/CTFE/BPAC copolymer and 750 g of Freon R-113 were put into a 1-liter stainless steel autoclave. After purging the gas atmosphere VDF monomer was charged into the autoclave, and the resultant mixture was subjected to graft polymerization reaction at 95° for 24 hr. The quantity of VDF monomer was made variable to prepare three kinds of soft fluororesins each of which was essentially a graft copolymer: 60 g for fluororesin (1), 80 g for fluororesin (2), and 100 g for fluororesin (3). In every run a solid portion of the reaction product was separated from the solvent and washed and dried to obtain a white powder. In the fluororesin (1) the ratio of the elastomeric polymer segment, P(VDF/CTFE/BPAC), to the crystalline polymer segments, PVDF, was 81:19 by weight. In the fluororesin (2) the same ratio was 71:29 by weight and in the fluororesin (3) 68:32 by weight.

As a fluorine-containing crystalline polymer, a commercial PVDF resin, SOLEF 2008 of Solvey Co., was blended with the fluororesin (2) in various proportions as shown in Table 1. In every case the mixture was kneaded by using hot rolls, and the kneaded blend was press-shaped into a sheet having a thickness of 1 mm. The floroesin (2) itself was also kneaded and press-shaped into a 1-mm thick film by the same method.

The resin sheets were subjected to tensile test at 23° C. by using tensile specimens of the dumb-bell shape according to ASTM D 1708. The tension rate was constantly 200 mm/min. The results are shown in Table 1.

TABLE 1

| Blended Resins (parts by wt.) | | Tensile Strength at break (kgf/cm$^2$) | Elongation at break (%) |
|---|---|---|---|
| Fluororesin (2) | PVDF (SOLEF 2008) | | |
| 100 | 0 | 230 | 437 |
| 100 | 20 | 265 | 440 |
| 100 | 50 | 352 | 385 |
| 100 | 80 | 387 | 394 |
| 100 | 100 | 350 | 390 |

As can be seen in Table 1, blending of up to 100 phr of the crystalline PVDF resin with the soft fluororesin (2) did not result in serious lowering of elongation at break. In general, the addition of a mere filler material to a soft polymer causes considerable lowering of elongation at brake. Therefore, it is probable that in every run in this example there was very good compatibility between the soft fluororesin (2) and the PVDF resin.

Figure 2:
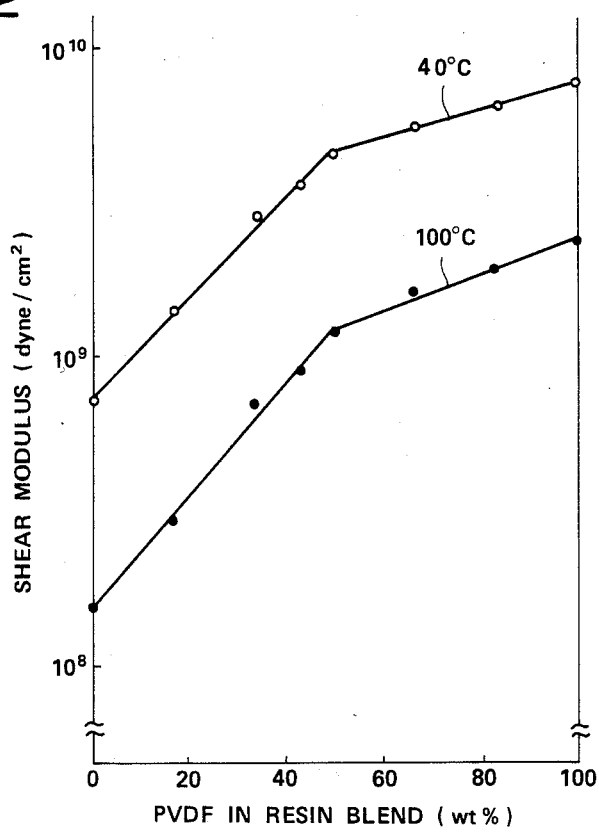
FIG. 2 is a graph showing the dependence of shear modulus of the same polymer blend on the amount of PVDF in the blend.

Further blends of the soft fluororesin (2) and SOLEF 2008 were prepared by varying the weight ratio of the fluororesin (2) to SOLEF 2008 to 80:100, 50:100 and 20:100. On all the blends prepared in this example and also on the fluororesin (2) and SOLEF 2008, Shore D scale hardness was measured at 23° C. by the method according to ASTM D 2240. FIG. 1 shows the results. On the same blends and starting resins, shear modulus was measured at 40° C. and at 100° C. by a torsion pendulum method. FIG. 2 shows the results. In both FIG. 1 and FIG. 2 there is a clear difference in the inclination of linear plotting between a region where the weight ratio of the PVDF resin to the soft fluororesin (2) is below 1 and another region where the same ratio is above 1. This is indicative of a change of a continuous phase of the blended fluororesin in the former region into a dispersed phase, i.e. dispersion of the soft fluororesin (2) in a PVDF matrix, in the latter region.

EXAMPLE 2

Figure 3:
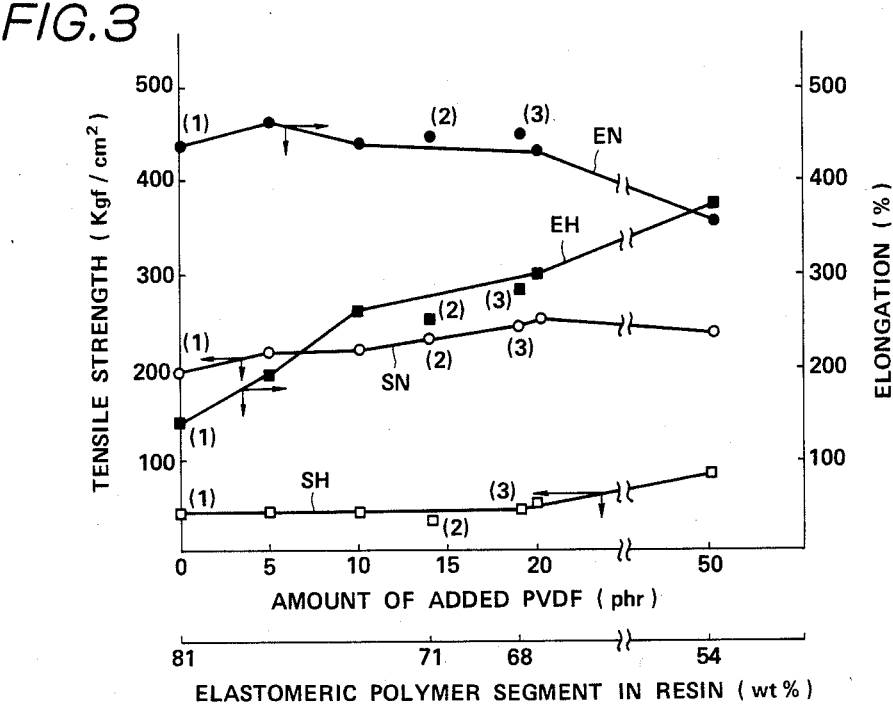
FIG. 3 is a graph showing variations in tensile characteristics of a polymer blend of PVDF and a fluorine-containing soft graft copolymer with the proportion of PVDF to the graft copolymer.

The soft fluororesin (1) prepared in Example 1 and the PVDF resin, SOLEF 2008, were blended in the proportions of 100:5, 100:10, 100:20 and 100:50 by weight. Every blend was formed into a 1-mm thick sheet by the same method as in Example 1. Also the fluororesins (1), (2) and (3) were individually kneaded and press-shaped into 1-mm thick sheets. All the resin sheets were subjected to tensile test at 23° C. and at 120° C. The test method was as mentioned in Example 1. The results are shown in FIG. 3. The curves SN and SH represent tensile strength (at break) at 23° C. and at 120° C., repsectively. The curves EN and EH represent elongation (at break) at 23° C. and at 120° C., respectively. The symbols (1), (2) and (3) indicate the fluororesins (1), (2) and (3), respectively. The measurements are plotted against the amount (phr) of the PVDF resin added to the fluororesin (1) and also against the content (wt %) of the elastomeric polymer segment in the tested resin.

FIG. 3 shows that a polymer blend obtained by blending 14 parts by weight of the PVDF resin (SOLE 2008) and 100 parts by weight of the soft fluororesin (1) will be equivalent to the fluororesin (2) in tensile strength and elongation, and that another blend obtained by increasing the amount of the PVDF resin to 19 phr will be equivalent to the fluororesin (3) in tensile characteristics.

Figure 4:
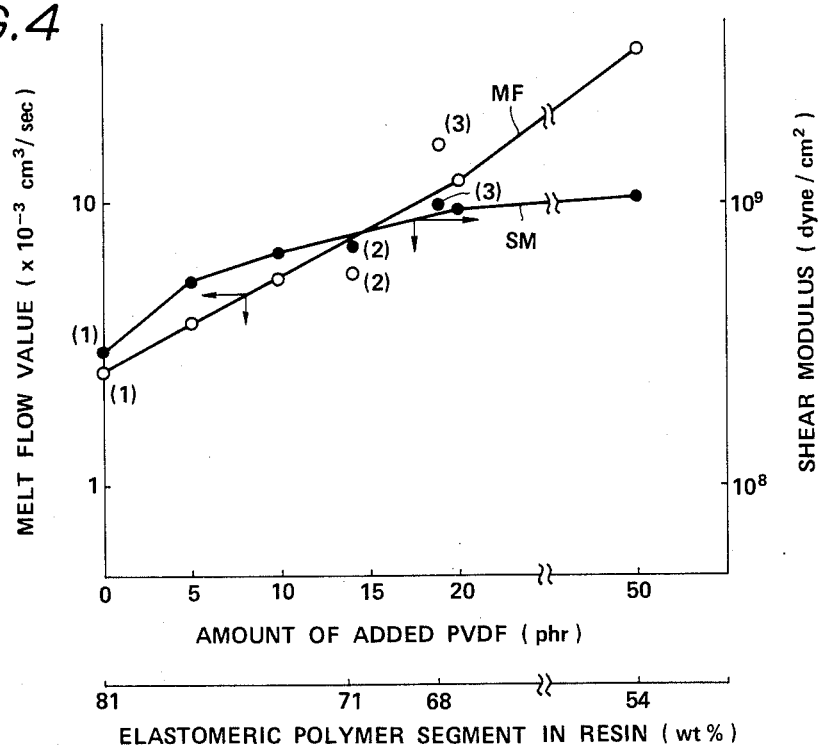
FIG. 4 is a graph showing variations in melt flow value and shear modulus of the same blend with the proportion of PVDF to the graft copolymer.

Melt flow value, shear modulus and Shore D hardness were also measured on the polymer blends prepared in Example 2 and also on the fluororesins (1), (2) and (3). The results are shown in Table 2. The measurement of melt flow value was made with a Kohka type flow tester, which is a sort of extrusion type plastometer having an orifice 1 mm in diameter and 10 mm in length. At the measurement the resin samples were heated to 240° C. under pressure of 100 kgf/cm$^2$. The testing methods for measurement of shear modulus and Shore D hardness were as mentioned in Example 1. In FIG. 4, the curve MF represents the results of measurement of melt flow value and the curve SM the results of measurement of shear modulus. The symbols (1), (2) and (3) are in the same sense as in FIG. 3. The measurements on the fluororesins (2) and (3) do not significantly deviate from the curves MF and SM. Accordingly it is understood that two kinds of polymer blends respectively having nearly the same physical properties as the fluororesins (2) and (3) can be obtained by appropriately blending a commercial PVDF resin with the fluororesin (1), so that the fluororesins (2) and (3) need not to be prepared in addition to the fluororesin (1).

EXAMPLE 3

Two different kinds of PVDF, viz. SOLEF 2010 and 2012 of Solvey Co., were each blended with the soft fluororesin (1) prepared in Example 1. These PVDF resins were higher in molecular weight than SOLEF 2008 used in Examples 1 and 2 as indicated by lower melt indices measured at 230° C. under load of 10 kg. SOLEF 2008: 35 g/10 min, SOLEF 2010: 18 g/10 min, SOLEF 2012: 5 g/10 min. The proportion of the fluororesin (1) to each PVDF resin was varied to 100:5, 100:10, 100:20 and 100:50 by weight. In every case the blend was kneaded and processed into a 1-mm thick sheet by the same method as in Example 1. The physical properties of the obtained blends were measured by the methods mentioned in Example 2. The results were as shown in Table 2. The properties of the three kinds of PVDF resins are also shown in the same table.

From Table 2 it is understood that when a given amount of PVDF is used the polymer blend becomes higher in tensile strength and elongation at 120° C. as the molecular weight of the blended PVDF is higher. On the other hand, it is convenient to use PVDF having a relatively low molecular weight for obtaining a polymer blend relatively high in melt flow value.

The blends prepared in Examples 2 and 3 were not significantly lower than the fluororesin (1) in elongation at break measured at 23° C. This is a good evidence of accomplishment of very uniform blending of two different types of polymers with high compatibility between the blended two polymers in every case of Examples 2 and 3.

EXAMPLE 4

100 parts by weight of the soft fluororesin (1) prepared in Example 1 was blended with 20 parts by weight of a crystalline copolymer of VDF and hexafluoroacetone (HFA). In the crystalline copolymer the content of HFA was 9 mol %. The blend was processed into a 1-mm thick sheet by the same method as in Example 1. Table 3 shows the tensile strength at break and elongation at break of this resin sheet measured at 23° C., the angle of contact of this resin sheet with water and the Shore D hardness of the same resin sheet in comparison with the measurements on the fluororesin (1). For reference the properties of the VDF/HFA copolymer are also shown in Table 3.

Accomplishment of very uniform blending was certain not only by visual observation of the sheet of the blend but also from the fact that the blending did not result in lowering of elongation in the tensile test. The change in the angle of contact with water indicates an improvement in water repellency of the fluororesin (1) by blending with the VDF/HFA copolymer.

TABLE 3

|  | Tensile Strength at break (kgf/cm$^2$) | Elongation at break (%) | Contact Angle with water (degree) | Shore D Hardness |
| --- | --- | --- | --- | --- |
| Fluoro-resin (1) | 190 | 440 | 87.8 | 45 |
| Blend of Ex. 3 | 215 | 460 | 93.2 | 46 |

TABLE 2

|  | Tensile Strength at break (kgf/cm$^2$) | | Elongation at break (%) | | Melt Flow Value at 240° C. | Shear Modulus at 40° C. | Shore D Hardness |
| --- | --- | --- | --- | --- | --- | --- | --- |
|  | 23° C. | 120° C. | 23° C. | 120° C. | ($\times 10^{-3}$ cm$^3$/sec) | ($\times 10^8$ dyne/cm$^2$) | at 23° C. |
| fluororesin (1) | 190 | 42 | 440 | 144 | 2.5 | 3.0 | 45 |
| fluororesin (2) | 230 | 38 | 437 | 248 | 5.8 | 7.0 | 48 |
| fluororesin (3) | 246 | 47 | 450 | 282 | 15.6 | 9.8 | 53 |
| Example 2 |  |  |  |  |  |  |  |
| PVDF (SOLEF 2008) | 340 | 380 | 90 | 545 | 57.8 | 85.0 | 79 |
| (1) + PVDF |  |  |  |  |  |  |  |
| 5 phr | 214 | 40 | 463 | 193 | 3.8 | 5.2 | 46 |
| 10 phr | 218 | 42 | 440 | 264 | 5.3 | 6.6 | 47 |
| 20 phr | 252 | 50 | 431 | 303 | 18.9 | 9.5 | 53 |
| 50 phr | 238 | 83 | 355 | 375 | 34.7 | 10.4 | 61 |
| Example 3 |  |  |  |  |  |  |  |
| PVDF (SOLEF 2010) | 377 | 410 | 220 | 625 | 31.2 | 85.0 | 79 |
| (1) + PVDF |  |  |  |  |  |  |  |
| 5 phr | 213 | 36 | 440 | 199 | 3.5 | 4.8 | 46 |
| 10 phr | 235 | 45 | 449 | 281 | 5.6 | 6.8 | 48 |
| 20 phr | 259 | 52 | 458 | 302 | 8.4 | 10.0 | 54 |
| 50 phr | 304 | 93 | 427 | 402 | 16.3 | 10.7 | 62 |
| Example 3 |  |  |  |  |  |  |  |
| PVDF (SOLEF 2012) | 420 | 440 | 310 | 655 | 12.3 | 86.0 | 80 |
| (1) + PVDF |  |  |  |  |  |  |  |
| 5 phr | 216 | 35 | 436 | 229 | 3.4 | 4.7 | 46 |
| 10 phr | 243 | 48 | 485 | 334 | 3.8 | 6.8 | 48 |
| 20 phr | 269 | 55 | 449 | 464 | 4.7 | 10.0 | 53 |
| 50 phr | 293 | 96 | 422 | 495 | 8.1 | 10.8 | 61 |

TABLE 3-continued

|  | Tensile Strength at break (kgf/cm²) | Elongation at break (%) | Contact Angle with water (degree) | Shore D Hardness |
|---|---|---|---|---|
| VDF/HFA copolymer | 230 | 620 | 102 | 48 |

EXAMPLE 5

Grafting of a copolymer of CTFE and ethylene to the elastomeric VDF/CTFE/BPAC copolymer prepared in Example 1 was accomplished in the following manner.

First, 100 g of the VDF/CTFE/BPAC copolymer was put into a 1-liter stainless steel autoclave. After purging the gas atmosphere 400 g of Freon R-114, 48.3 g of CTFE monomer and 11.6 g of ethylene were charged into the autoclave, and the resultant mixture was subjected to graft polymerization reaction at 95° C. for 24 hr. A solid portion of the reaction product was separated from the solvent and washed and dried to obtain a white powder.

In the thus obtained soft fluororesin (4) the ratio of the elastomeric polymer segment to the crystalline polymer segments (CTFE/ethylene) was 79:21 by weight.

As a fluorine-containing crystalline polymer, an alternating copolymer of ethylene and CTFE (Halar resin No. 300 of Allied Chemical Corp.) was blended with the soft fluororesin (4). The proportion of the fluororesin (4) to the Halar resin was varied to 100:20 and 100:50 by weight. In each case the blend was processed into a 1-mm thick sheet by the same method as in Example 1. The fluororesin (4) and the Halar resin were each processed in the same manner. The physical properties of the obtained blends and the resins used for blending were measured by the methods mentioned in Example 2. In this example, melt flow values were measured at 260° C. The results are shown in Table 4.

TABLE 4

|  | Tensile Strength at break at 23° C. (kgf/cm²) | Elongation at break at 23° C. (%) | Shear Modulus at 40° C. ($\times 10^8$ dyne/cm²) | Melt Flow Value at 260° C. ($\times 10^{-3}$ cm³/sec) | Shore D Hardness at 23° C. |
|---|---|---|---|---|---|
| Fluororesin (4) | 155 | 350 | 2.8 | 5.8 | 48 |
| Halar No. 300 | 490 | 80 | 65 | 15.2 | 73 |
| (4) + Halar No. 300 |  |  |  |  |  |
| 20 phr | 170 | 345 | 8.6 | 6.4 | 53 |
| 50 phr | 194 | 310 | 11.0 | 7.8 | 62 |

It is certain that very uniform blending was accomplished since the blending did not result in significant lowering of elongation at the tensile test. By blending with the crystalline ethylene/CTFE copolymer both shear modulus and melt flow value of the fluororesin (4) were considerably modified, and such effects of the blending increased with increase in the amount of the blended crystalline copolymer.

What is claimed is:

1. A flexible and melt-processable fluororesin, comprising a blend of 100 parts by weight of a first polymer, which is obtained by graft copolymerization of vinylidene fluoride with an elastomeric copolymer of vinylidene fluoride, chlorotrifluoroethylene and another monomer which has both a double bond and a peroxy bond, and 5-80 parts by weight of a crystalline second polymer which is a vinylidene fluoride base polymer, said fluororesin being not higher than 70 in Shore D hardness at room temperature.

2. A fluororesin according to claim 1, wherein said another monomer is selected from the group consisting of t-butyl peroxymethacrylate, t-butyl peroxyacrylate, t-butyl peroxyallylcarbonate, n-butyl peroxyallylcarbonate, di(t-butylperoxy)fumarate, t-butyl peroxycrotonate and p-menthane peroxyallylcarbonate.

3. A fluororesin according to claim 1, wherein said second polymer is a homopolymer of vinylidene fluoride.

4. A fluororesin according to claim 1, wherein said second polymer is a copolymer of vinylidene fluoride and hexafluoroacetone.

5. A fluororesin according to claim 1, wherein in the graft copolymer as said first polymer the weight ratio of the elastomeric copolymer segment to the grafted vinylidene fluoride polymer segment is in the range from 50:50 to 99:1.

6. A flexible and melt-processable fluororesin, comprising a blend of 100 parts by weight of a first polymer, which is obtained by graft copolymerization of chlorotrifluoroethylene and ethylene with an elastomeric copolymer of vinylidene fluoride, chlorotrifluoroethylene and another monomer which has both a double bond and a peroxy bond, and 5-80 parts by weight of a crystalline second polymer which is a copolymer of chlorotrifluoroethylene and ethylene, said fluororesin being not higher than 70 in Shore D hardness at room temperature.

7. A fluororesin according to claim 6, wherein in the graft copolymer as said first polymer the weight ratio of the elastomeric copolymer segment to the grafted chlorotrifluoroethylene and ethylene polymer segment is in the range from 50:50 to 99:1.

8. A fluororesin according to claim 6, wherein said another monomer is selected from the group consisting of t-butyl peroxyamethcrylate, t-butyl peroxyacrylate, t-butyl peroxyallylcarbonate, n-butyl peroxyallylcarbonate, di(t-butylperoxy)fumarat t-butyl peroxycrotonate and p-menthane peroxyallylcarbonate.

* * * * *